Feb. 23, 1937. J. W. DEWS 2,071,505
FASTENER
Filed April 29, 1935
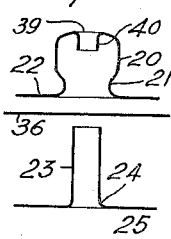
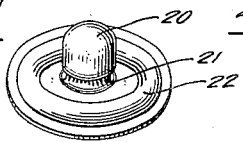
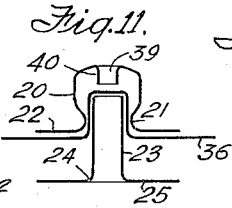
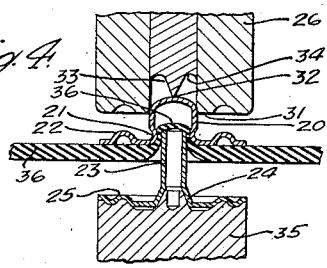
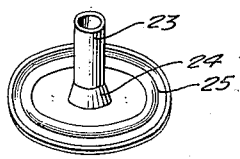
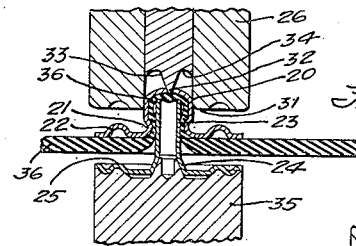
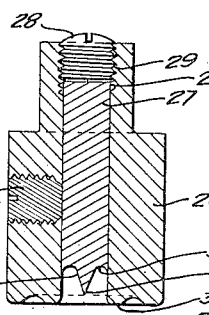
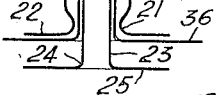
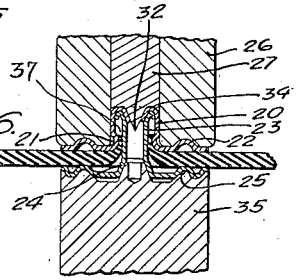
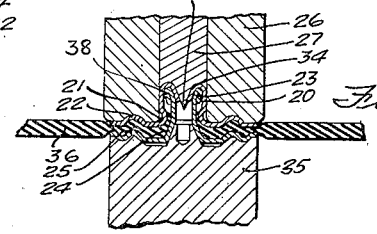
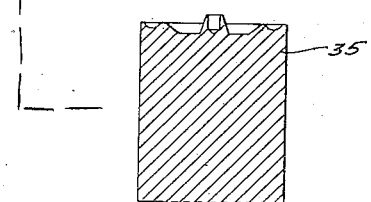
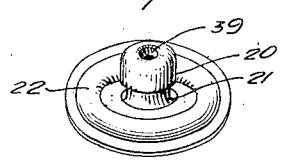
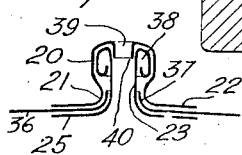
INVENTOR
JOSEPH W. DEWS
BY
Fraser, Myers & Manley
ATTORNEYS.

Patented Feb. 23, 1937

2,071,505

UNITED STATES PATENT OFFICE 2,071,505

FASTENER

Joseph W. Dews, Waterbury, Conn., assignor to Scovill Manufacturing Company, Waterbury, Conn., a corporation of Connecticut Application April 29, 1935, Serial No. 18,824

1 Claim. (Cl. 24—219)

This invention relates to improvements in fastening devices for garments or other articles of which they are intended to form parts. Although applicable to fasteners of a widely varying character, the novel features of the invention are particularly designed as improvements in fasteners for articles of wearing apparel, and are herein disclosed as applied to the stud element of a snap fastener of the ball-and-socket type adapted for use on a sheet rubber or equivalent elastic material.

It is an object of the invention to produce a fastener of a simple character which may be readily attached to rubber or similar elastic sheet material without the necessity of perforating the material before applying the elements of the fastener, or of using accurately fitting elements having sharpened edges to perforate the material as they are applied, or of resorting to the use of a fastener tack having a pointed end to perforate the material as it is forced into the stud.

The novel tool which is herein illustrated and described as a means of applying the above-mentioned fastener forms no part of the invention to be claimed herein but has been disclosed and claimed in a copending divisional application, Serial No. 79,538, filed May 13, 1936; and the herein-disclosed method which may be used with the aid of the above-mentioned tool as a means of applying fastener elements embodying the invention likewise forms no part of the invention to be claimed in this case but has been disclosed and claimed in another copending divisional application, Serial No. 79,539, filed May 13, 1936.

The improved fastener comprises a pair of loosely telescoping, flanged elements which may, as a matter of convenience, be referred to respectively as a stud and an eyelet. The stud-entering end of the eyelet need not be sharpened and should be of a diameter somewhat smaller than the opening in the stud, so that when the stud and eyelet are telescoped one within the other, with the elastic sheet material between them, the part of the sheet material immediately overlying the entering end of the eyelet will be stretched and thrust into the opening in the stud, the loose fit between the eyelet and the stud being such as to afford ample space for the elastic material to enter. After the eyelet has stretched the elastic material overlying its entering end and forced it into the opening in the stud, the stretched elastic material at the center of the entering end of the eyelet may be perforated so as to be free to expand and be drawn backwardly towards the base of the eyelet so as to relieve the strain and leave a large portion of the inserted end of the eyelet bare. The stud and eyelet may then, in a manner and by means which will hereinafter be described, be secured to each other by causing the inserted end of the eyelet to be rolled outwardly into a clinching engagement with the surrounding portion of the stud. By thus forcing the eyelet into the stud and rolling its end into engaging relation with the inner part of the head of the stud, the flanges of the stud and eyelet may be brought into a close engaging relationship with the sheet material immediately surrounding the inserted part of the eyelet, which will have been relieved from anything in the nature of excessive strain and restored to approximately normal condition after being perforated and before being clamped between the flanges of the stud and eyelet so as to lie flat and smooth without any puckers or wrinkles after the fastener has been applied.

The improved fastener, as applied to the article on which it is to be used, differs from known constructions of the prior art in that the elastic material, although no part of it has been cut out and removed, is drawn clear of the portion of the eyelet which is rolled into an engaging relation with the inner wall of the stud, and although clamped between the flanges of the stud and eyelet, the edge portion which surrounds the eyelet has no tendency to expand the walls of the protuberant portion of the stud at its base since the designed loose fit between the stud and the eyelet is such as to provide space for the entrance of the stretched rubber when the eyelet is first thrust into the stud and for the withdrawal of the rubber surrounding the eyelet after it has been perforated.

In the accompanying drawing illustrating a preferred form of the invention,—

Figure 1 is a perspective view of a conventional form of snap fastener stud.

Fig. 2 is a conventional form of eyelet which might be used in securing the stud of Fig. 1 to a part of a rubber garment or other article of sheet material. These two parts need not differ from those commonly used in the prior art other than that the portion of the eyelet intended to enter the opening in the back of the stud should be of slightly smaller diameter than would ordinarily be used in order to allow the sheet material to enter and be withdrawn.

Fig. 3 is an axial cross-sectional view through a stud, an eyelet, a sheet of material to which the stud and eyelet are to be applied, and setting tools including a pointed mandrel and a pair of anvils by which the application can be effected.

Figs. 4, 5, 6 and 7 are similar cross-sectional views of the parts illustrated in Fig. 3, such parts being represented in different positions to which they are successively moved when applying the stud and eyelet to the intervening sheet of elastic material.

Fig. 8 is a view, partly in axial cross section and partly in perspective, representing a snap fastener stud and eyelet secured to a sheet of elastic material.

Fig. 9 is a perspective view of a modified form of fastener stud which may be used in practicing the invention.

Fig. 10 is a diagrammatic cross-sectional view of another modified form of the invention, the parts illustrated representing a fastener stud, eyelet and an intervening piece of sheet material, the stud having a piercing element extending downwardly from its inner upper surface.

Fig. 11 is a similar view of the same parts, the end of the eyelet being represented as having been thrust into the stud and as having stretched a part of the sheet material over its upper end.

Fig. 12 is a similar view of the same fastener parts, the eyelet being represented as having been thrust farther into the stud to a position such that further movement will cause the sheet material to be punctured.

Fig. 13 is a similar view of the same elements, the fastener parts being represented as having been secured to the sheet material.

As has already been explained, the stud illustrated by Fig. 1 is of conventional form comprising the usual head 20, neck 21 and flange 22. Likewise, the eyelet may be of conventional form comprising a hollow cylindrical post 23, base 24 and flange 25.

The setting tool for the stud, as best illustrated in Fig. 3, may comprise a body portion 26 and a core 27 telescoped one within the other. The core may be adjustably secured within the body portion in any appropriate manner with its lower end slightly above the lower end of the body portion. In the form of tool herein disclosed the upper end of the core 27 is slotted as at 28 and has threaded engagement as at 29 with the inner wall of the body portion so that by the use of an ordinary screw-driver, the position of the core within the body portion may be readily adjusted, and, if desired, the core may be held in any such position of adjustment, in any suitable manner, as by the use of a set-screw 30 in the body portion having its end so positioned that it may be forced into clamping engagement with the surface of the core.

The lower working face 31 of the body portion of the setting tool should be of a form such as to serve as an anvil for the flange of the stud, and the opening in the body portion of the tool which receives the core 27 should be of a diameter such that its lower end may serve as a recess of a size adapted to receive the head of the stud.

At the center of the lower end of the core is a part which may be properly referred to as a mandrel, having a pointed end as at 32 and an outwardly flaring wall 33 of substantially conical form merging into an annular curved surface 34 which serves as an anvil for the head of a fastener stud during a setting operation.

The anvil 35 should have an upper working surface adapted to conform with that of the base of the eyelet to be used in securing the stud to an intervening sheet of rubber or other elastic material 36.

The stud and eyelet illustrated in Fig. 3 may be secured to the sheet material 36 by the use of any appropriate machine (not shown) adapted to force the setting tool 26, 27 and anvil 35 towards each other. Machines operated by hand power, foot power, and what are known as automatic machines, adapted for use in thus securing fastener parts to sheet material are well known in the prior art and need not be herein specifically disclosed.

The approximate relative movements of the parts of the fastener elements and setting tools during a setting operation are illustrated in Figs. 4 to 7, inclusive, it being understood, of course, that the relative degree of movement of the different parts with respect to one another may vary to some extent and might not exactly conform with the conventional representation in the various figures of the drawing. In Fig. 4 the stud is represented as having been moved into the recess in the lower part of the setting tool with the center of its head in contact with the perforating point 32. In the same view the upper end of the eyelet is represented as having engaged and stretched the overlying part of the sheet of elastic material 36 and forced it into the opening in the base of the stud. In Fig. 5 the eyelet is represented as having forced the stretched overlying elastic material to a position quite close to the under surface of the head of the stud, and the perforating point of the setting tool is represented as having been thrust through the wall of the head of the stud to a position in which it is in readiness to perforate the underlying portion of the sheet of elastic material. In Fig. 6 the elastic material is represented as having been perforated and the edges of the portion surrounding the perforation are represented as having been stretched outwardly sufficiently to snap down towards the base of the eyelet to the positions indicated at 37, Fig. 6. In this figure the eyelet is represented as having been thrust upwardly to a position such that its entering end surrounding the flaring wall 33 of the mandrel has been rolled over after making contact with the under surface of the head of the stud, the flange 25 of the eyelet and the flange 22 of the stud approaching the positions in which they will clamp the elastic material 36 between them.

In Fig. 7 the setting operation is indicated as having been completed. The upper end of the eyelet and the adjacent portion of the head of the stud are represented at 38 as having been rolled into a clinching engagement with each other by the flaring wall 33 of the mandrel and surrounding wall 34 of the core 27 of the tool. The flanges 22, 25 of the stud and eyelet are also represented as having been pressed into clamping engagement with the portion of the sheet of elastic material 36 surrounding the part through which the post of the eyelet has been inserted.

Fig. 8 represents the stud and eyelet as having been attached to the sheet of elastic material and the setting tools withdrawn. It will be apparent that since the stretched portion of the sheet of elastic material has been perforated and permitted to expand and slip down towards the base of the eyelet, there will be no layer of intervening elastic material to interfere with the satisfactory clinching of the upper end of the eyelet in the head of the stud, and since the annular space between the post of the eyelet and the inner wall of the stud is such as to provide for a free movement of the stretched elastic material, the part of the elastic material to which the fastener elements are secured is permitted to return to a substantially normal condition before it is clamped between the flanges 22, 25 of the stud and eyelet, thus avoiding any wrinkling of the surrounding material.

In Figs. 3 to 7, inclusive, the stud is represented as one having an imperforate head which is perforated by the point 32 of the setting tool during a setting operation. In Fig. 9 is illustrated a modified form of stud having a centrally-disposed perforation 39 in its head through which the point 32 of the setting tool may enter and then perforate the underlying elastic material to which the stud is to be secured. The perforation may be made with an ordinary drift-pin, and, if desired, the knurled burr may be removed before securing the stud to the article on which it is to be used. When using this preperforated form of fastener element it may be immediately thrust to a seated position in the recess in the setting tool, that is, to the position indicated in Fig. 6, at the initial stage of the setting operation, illustrated by Fig. 4, with the point 32 of the mandrel extended through the perforation in the fastener element in readiness to perforate the elastic material when forced against it by the upper end of the eyelet as it is moved towards the position in which it is illustrated in Fig. 6.

The stud and eyelet or other fastening elements to which the invention is applied may be made of any appropriate metal or alloy. If used on rubber, aluminum or some other non-copper content metal would serve as a satisfactory material for the fastener elements.

As already explained, the perforated fastener of the character of the one illustrated by Fig. 9 may be applied to the sheet material, on which it is to be used, with the aid of the tool illustrated in Fig. 3, whether or not the inturned burr of metal surrounding the perforation 39 has been removed. If the burr is permitted to remain, the form and dimensions of the mandrel may be such that the point 32 will extend below the burr and serve as a means of perforating the underlying sheet material during a fastening operation before the sheet material is brought into contact with the burr.

As distinguished from the form in which the invention has been presented by Figs. 1 to 9, inclusive, and the description thereof, Figs. 10 to 13, inclusive, illustrate in diagram a modified form in accordance with which the head of the fastener element represented as a stud has a portion of the fastener wall surrounding a centrally-disposed perforation in the head of the stud extended downwardly so that it may serve as a means of puncturing sheet material when thrust into contact therewith and not be dependent upon the use of a setting tool having a pointed puncturing element to be thrust through the perforation.

In Fig. 10 is represented in diagram a stud having a head 20, neck 21, flange 22 and perforation 39, conforming with the stud illustrated by Fig. 9. There is also represented in Fig. 10 an eyelet having a post 23, base 24 and flange 25, similar to the one illustrated by Fig. 2. 36 of the diagram is representative of a piece of sheet material to which the stud and eyelet may be secured.

The stud illustrated by Fig. 10 is represented as having a portion of the metal wall of the fastener immediately surrounding the perforation 39 turned inwardly so as to form a downwardly-extending tubular projection 40, which might comprise the burr which would result from the use of an ordinary drift-pin as the means of perforating the head of the stud, or the extension 40 might be formed in any other appropriate manner. As will be shown, this burr or equivalent inwardly and downwardly extended tubular portion of the fastener may serve as a means of puncturing elastic sheet material when thrust into the fastener element by an eyelet during the operation of securing parts of the fastener to the material on which they are to be used.

In Fig. 11 the end of the eyelet post is represented as having been caused to stretch the overlying portion of the sheet material 36 and as having thrust a portion of the material into the hollow portion of the stud.

In Fig. 12 the post 23 of the eyelet is represented as having been thrust farther into the hollow part of the stud and the overlying stretched portion of the sheet material is represented as having been brought into contact with the edge portion of the extension 40, so that further movement of the post will cause the stretched sheet material to be punctured.

In Fig. 13 the parts represented in Figs. 10, 11 and 12 are illustrated as having been firmly secured together. It will be understood that the puncturing of the stretched elastic material overlying the end of the post, by a slight advance movement of the post from the position represented in Fig. 12, will cause the punctured elastic material to slip over and down the wall of the post to a position near the base as represented at 37, Fig. 13. Following this puncturing of the stretched elastic material and the drawing away of the material from the upper part of the post of the eyelet, further telescoping movement of the stud and eyelet causes the upper end of the post to be rolled outwardly about the tubular extension 40 and downwardly along the inner walls of the head of the stud to a clinching engagement with the stud head, as indicated at 38 in Fig. 13.

The puncturing of the stretched elastic material so as to permit the portion distorted by thrusting the post into the stud to be relieved of strain, and to permit the parts surrounding the post of the eyelet to be restored substantially to their normal condition before moving the flanges 22 and 25 of the stud and eyelet from the positions represented in Fig. 12 to the clamping position represented in Fig. 13, tends to prevent the wrinkling or puckering of the sheet material surrounding the attached parts of the fastening element.

The invention is not intended to be limited to the specific tool, method and fastener parts herein disclosed for purposes of illustration, but should be regarded as including modifications and variations thereof within the scope of the appended claim.

What is claimed is:—

A fastening device for sheet material comprising a stud element and a hollow attaching rivet telescoped one within the other with a perforated portion of the sheet material between them, the stud element consisting of a dome-like head having a centrally disposed opening in its top, a substantially tubular inwardly extending portion surrounding the opening, a substantially flat base having an opening of greater diameter than the outer diameter of the tubular extension in the head and a neck of less diameter than the head connecting the outer periphery of the head with the portion of the base immediately surrounding its opening; and the attaching rivet consisting of an open-ended hollow post of which the inner diameter is approximately equal to the outer diameter of the tubular extension of the head and of which the outer diameter is less than the inner diameter of the neck and opening in the base of the stud by an amount substantially equal to twice the thickness of the sheet material and a substantially flat base extending outwardly from the foot of the post, the end portion of the post opposite its base being clinched into the annular channel-like portion of the head surrounding its tubular extension and the portion of the sheet material adjacent the fastening device being clamped between the bases of the stud element and the attaching rivet, the post being extended through the perforation in the sheet material and the annular margin of the material at the perforation being spaced from the annular zone of clinching contact between the end portion of the post and the head of the stud.

JOSEPH W. DEWS.